(12) United States Patent
Engländer et al.

(10) Patent No.: US 10,944,308 B2
(45) Date of Patent: Mar. 9, 2021

(54) DEVICE FOR STORING KINETIC ENERGY

(71) Applicant: Leybold GmbH, Köln (DE)

(72) Inventors: Heinrich Engländer, Linnich (DE); Robert Schneiders, Lohmar-Agger (DE)

(73) Assignee: LEYBOLD GMBH, Cologne (DE)

( * ) Notice: Subject to any disclaimer, the term of this patent is extended or adjusted under 35 U.S.C. 154(b) by 321 days.

(21) Appl. No.: 15/776,682

(22) PCT Filed: Nov. 15, 2016

(86) PCT No.: PCT/EP2016/077765
§ 371 (c)(1),
(2) Date: May 16, 2018

(87) PCT Pub. No.: WO2017/085076
PCT Pub. Date: May 26, 2017

(65) Prior Publication Data
US 2018/0351433 A1 Dec. 6, 2018

(30) Foreign Application Priority Data
Nov. 19, 2015 (DE) .................... 20 2015 007 985 U

(51) Int. Cl.
*H02K 7/02* (2006.01)
*F03G 3/08* (2006.01)
*F04D 19/04* (2006.01)

(52) U.S. Cl.
CPC .............. *H02K 7/025* (2013.01); *F03G 3/08* (2013.01); *F04D 19/042* (2013.01); *Y02E 60/16* (2013.01)

(58) Field of Classification Search
CPC .. H02K 7/02; H02K 7/025; F03G 3/08; F04D 19/04; F04D 19/042; Y02E 60/16
See application file for complete search history.

(56) References Cited

U.S. PATENT DOCUMENTS

| | | |
|---|---|---|
| 5,462,402 A | 10/1995 | Bakholdin et al. |
| 7,798,788 B2 | 9/2010 | Varennes et al. |
| 9,887,604 B2 | 2/2018 | Bremer et al. |
| 2006/0140794 A1 | 6/2006 | Schofield |
| 2011/0037265 A1 | 2/2011 | Fiedler |

(Continued)

FOREIGN PATENT DOCUMENTS

| | | |
|---|---|---|
| AU | 2006203265 A1 | 7/2006 |
| CN | 1963231 B | 8/2011 |

(Continued)

OTHER PUBLICATIONS

International Search Report dated Feb. 13, 2017 for PCT application No. PCT/EP2016/077765.

(Continued)

*Primary Examiner* — Naishadh N Desai
(74) *Attorney, Agent, or Firm* — Ohlandt, Greeley, Ruggiero and Perle, LLP

(57) ABSTRACT

A device for storing kinetic energy, which has a flywheel in a housing. The flywheel is mounted in the housing via a shaft. A motor-generator unit is provided for storing energy as well as for energy recovery. In order to improve efficiency, a vacuum pump for evacuating the interior is arranged in the housing. The vacuum pump is disposed on the shaft.

18 Claims, 4 Drawing Sheets

(56) References Cited

U.S. PATENT DOCUMENTS

| | | | | |
|---|---|---|---|---|
| 2014/0125171 A1* | 5/2014 | Bremer | ............... | H02K 7/025 |
| | | | | 310/74 |
| 2015/0211599 A1* | 7/2015 | Baumer | ............... | F16F 15/305 |
| | | | | 74/572.12 |
| 2016/0369783 A1* | 12/2016 | Schofield | ............... | F04C 25/02 |
| 2016/0369807 A1* | 12/2016 | Schofield | ............... | F04D 17/168 |

FOREIGN PATENT DOCUMENTS

| | | |
|---|---|---|
| DE | 202012006991 U1 | 4/2013 |
| DE | 102012110691 A1 | 5/2014 |
| EP | 2933497 A2 | 10/2015 |
| EP | 3106662 A1 | 12/2016 |
| JP | 2006509952 A | 3/2006 |
| JP | 2011245527 A | 12/2011 |
| JP | 2014095378 A | 5/2014 |
| JP | 2015080369 A | 4/2015 |
| WO | 2015043993 A2 | 4/2015 |
| WO | 2016032839 A1 | 3/2016 |

OTHER PUBLICATIONS

Chinese Search Report dated Apr. 22, 2019 for Chinese patent application No. 201680066441.9.

\* cited by examiner

DEVICE FOR STORING KINETIC ENERGY

BACKGROUND

1. Field of the Disclosure

The disclosure relates to a device for storing kinetic energy.

2. Discussion of the Background Art

Due in particular to the growing proportion of regenerative energy sources, strong fluctuations exist in the power supply network, so that a continuous power supply is possibly not guaranteed. For compensating for such supply fluctuations, the installation of energy storages is required. For the storage of energy, it is known to provide flywheels. Such flywheels are arranged on a shaft and are connected to a motor-generator unit. Using the motor-generator unit it is possible on the one hand to drive the flywheel and on the other hand to use the rotating flywheel for energy recovery. The efficiency of an energy storage depends largely on the system's own energy demand.

It is known e.g. from DE 10 2012 110 691 to arrange a flywheel in a housing and to generate a vacuum inside the housing. The efficiency of the device for storing kinetic energy increases due to the generation of a vacuum. DE 10 2012 110 691 suggests to design parts of the flywheel directly as a vacuum pump. For this purpose, surfaces of the flywheel are provided with groove-like channels so that, on the cylinder side, the flywheel acts similar to rotor of a Holweck stage, while it acts as a Siegbahn stage on the front end side. Such an arrangement does not allow for the generation of a low vacuum or a very low pressure within a housing in which the flywheel is arranged. However, the efficiency of the device could be improved by a reduction in pressure.

The device for storing kinetic energy described in DE 10 2012 110 691 further has the disadvantage that the centrifugal forces occurring due to the high speed of rotation of the flywheel, and thus the expansion of the rotation body, are very great. These forces are speed-dependent and thus also have an effect on the gap ratios of the flywheel at the Holweck stages where the channels of the conveying screw threads are provided. Therefore, it is necessary to provide relatively large sealing gaps at the channel webs to avoid damage by contact between the rotor and the stator. The efficiency of the pump is decreased thereby.

Moreover, it is a drawback in DE 10 2012 110 691 to provide channels in many regions of the rotor surface. This pump mechanism is a friction vacuum pump. Thus, friction is generated in a region in which friction should actually be avoided in order to improve the efficiency.

It is an object of the disclosure to provide a device for storing kinetic energy with improved efficiency.

SUMMARY

A device for storing kinetic energy comprises a flywheel. The flywheel is arranged in an interior of a housing, wherein the housing comprises e.g. a housing body and a housing cover. A shaft is connected to the flywheel. The shaft is supported either indirectly or directly in the housing. It is particularly preferred that the support is effected using magnetic bearings, since the energy consumption of the device may be reduced and thus the efficiency may be improved. Further, the device for storing kinetic energy comprises a motor-generator unit. The same serves to drive the flywheel on the one hand and, on the other hand, to recover energy. The unit may be such that the same component serves both as a motor and a generator. Possibly, these may also be separate components. Further, a vacuum pump is arranged in the housing to evacuate the interior. This vacuum pump preferably transfers the pumped gas to a backing pump which then compresses against atmosphere. According to the disclosure, it is particularly preferred with this energy storage device to provide a vacuum pump formed by a turbo axial compressor with blade geometries and a gas friction compressor preferably in the form of Holweck, Gaede or Siegbahn stages, which vacuum pump is arranged on the shaft of the flywheel. This has the advantage according to the disclosure that lower centrifugal forces act on the components of the vacuum pump independent of the flywheel.

In a preferred embodiment of the disclosure the vacuum pump is formed as a separate component and is arranged on the shaft. In particular, the essential components of the pump are thus not part of the flywheel, so that it is possible to configure these components of the vacuum pump preferably with regard to their design, their arrangement, the material used etc. such that the centrifugal forces acting thereon cause relatively small deformations or that the efficiency of the pump is influenced as little as possible by such deformations. Specifically, in this embodiment, the vacuum pump is designed as a separate component and is arranged on the shaft, which has the advantage that the centrifugal forces acting on the vacuum pump are reduced due to the arrangement on the shaft and that, further, the pump design can be improved corresponding to the centrifugal forces acting.

In a particularly preferred embodiment, the vacuum pump is arranged at least partly inside an outer casing. Here, the outer casing is preferably made of fiber-reinforced plastic material or includes fiber-reinforced plastic material. This has the advantage that a high stability can be achieved while the weight is low. Thus, the outer casing serves to define the arrangement of the vacuum pump components as exactly as possible even at high centrifugal forces, so that the pump has a high efficiency or the efficiency of the centrifugal forces is affected as little as possible.

In a preferred embodiment, the vacuum pump is designed as an external rotor. In this embodiment, the outer casing is connected to the flywheel or is carried by the same. The conveying elements of the vacuum pump, in particular the rotor discs, are connected to the outer casing. In this regard, e.g. a plurality of rotor discs of a turbomolecular stage may be provided, wherein e.g. ring elements are arranged between the rotor discs to define the distance between the rotor discs. Correspondingly, further conveying elements, such as stator discs, are provided in this embodiment. The stator discs are connected to the housing e.g. by a carrier element, since the stator discs do not rotate. The stator discs may also be individual discs, the distance between which is defined by ring elements arranged between the stator discs.

In a particularly preferred embodiment an inner casing is provided, the vacuum pump being arranged at least in part outside the inner casing. With an external rotor it is preferred that the inner casing is indirectly or directly connected to the housing, the inner casing, in this case, supporting the stationary elements of the pump such as In particular the stator discs.

In a preferred development, the inner casing may be spaced from the shaft. A further pump stage, which in a particularly preferred embodiment is a Holweck stage, may be arranged in this space.

In another preferred embodiment of the disclosure, the outer casing is connected to the housing, in particular to the housing cover. In this embodiment, the non-rotating elements of the vacuum pump, in particular the stator discs, may be connected to the outer casing. The rotating elements, such as the rotor discs, are preferably connected to the shaft in this embodiment. In this case, the connection may be a direct one. It is also possible to provide an inner casing which in a preferred embodiment is connected to the shaft and supports the rotor discs or rotor elements of another design.

In a multi-stage vacuum pump a further stage may be provided also in this embodiment e.g. between an inner casing spaced from the shaft and thus between the inner casing and the shaft. In a preferred embodiment this further pump stage is a Holweck stage.

Regardless of whether the vacuum pump is designed as an outer rotor or an inner rotor, it is particularly preferred to provide a two- or multi-stage vacuum pump. Especially when providing a two-stage vacuum pump, it is preferred to design the first stage as a turbomolecular pump stage and to design the second stage as a Holweck, Gaede or Siegbahn stage. Irrespective of the type of pump, this second stage is preferably arranged downstream of the first stage, seen in the flow direction. The upstream turbomolecular stage allows for a further pressure reduction, which is advantageous for the efficiency of the flywheel.

In operation, i.e. after an initial evacuation of the interior of the housing and thereafter, only small quantities of gas charge this pump combination which in technical language is also referred to as a wide range pump or a compound pump. An increase in pressure by this small quantity of gas is caused substantially only due to leaks. As a consequence, the backing pump of the compound pump may be temporarily deactivated in operation, whereby the efficiency of the total system for string kinetic energy is further improved. In this phase, the compound pump compresses against the closed backing pump until the maximum allowable backing pressure for the compound pump is reached and the high vacuum-side pressure thereby rises again. In this case, the backing pump has to be activated again so as to lower the backing pressure again and to operate the system under optimal conditions.

Rotary vane, scroll or screw-type pumps are particularly well suited a backing pumps, since they generate a lower backing pressure than the compound pump requires and thereby allow for a temporary deactivation. In this regard, it is preferred that, as described before, the backing pump is operated only when a relatively high pressure prevails in the interior of the casing.

In a particularly preferred development, a buffer chamber is provided between a housing outlet and the backing pump. A buffer volume may be generated in this buffer chamber so that the compound pump can pump into this buffer volume, until its allowable baking pressure is reached. In this manner, the active phase of the backing pump can be shortened.

The disclosure thus also relates to a device for storing kinetic energy, in which the backing pump does not have to be arranged on the shaft, while the housing outlet is, however, connected to a vacuum pump. In a preferred development of this device, a buffer chamber is arranged between the vacuum pump outlet and the backing pump.

It is particularly preferred that the vacuum pump used is developed as described above.

The disclosure will be described hereinafter in more detail with reference to preferred embodiments and to the accompanying drawings.

DETAILED DESCRIPTION OF THE PREFERRED EMBODIMENT

Figure 1:
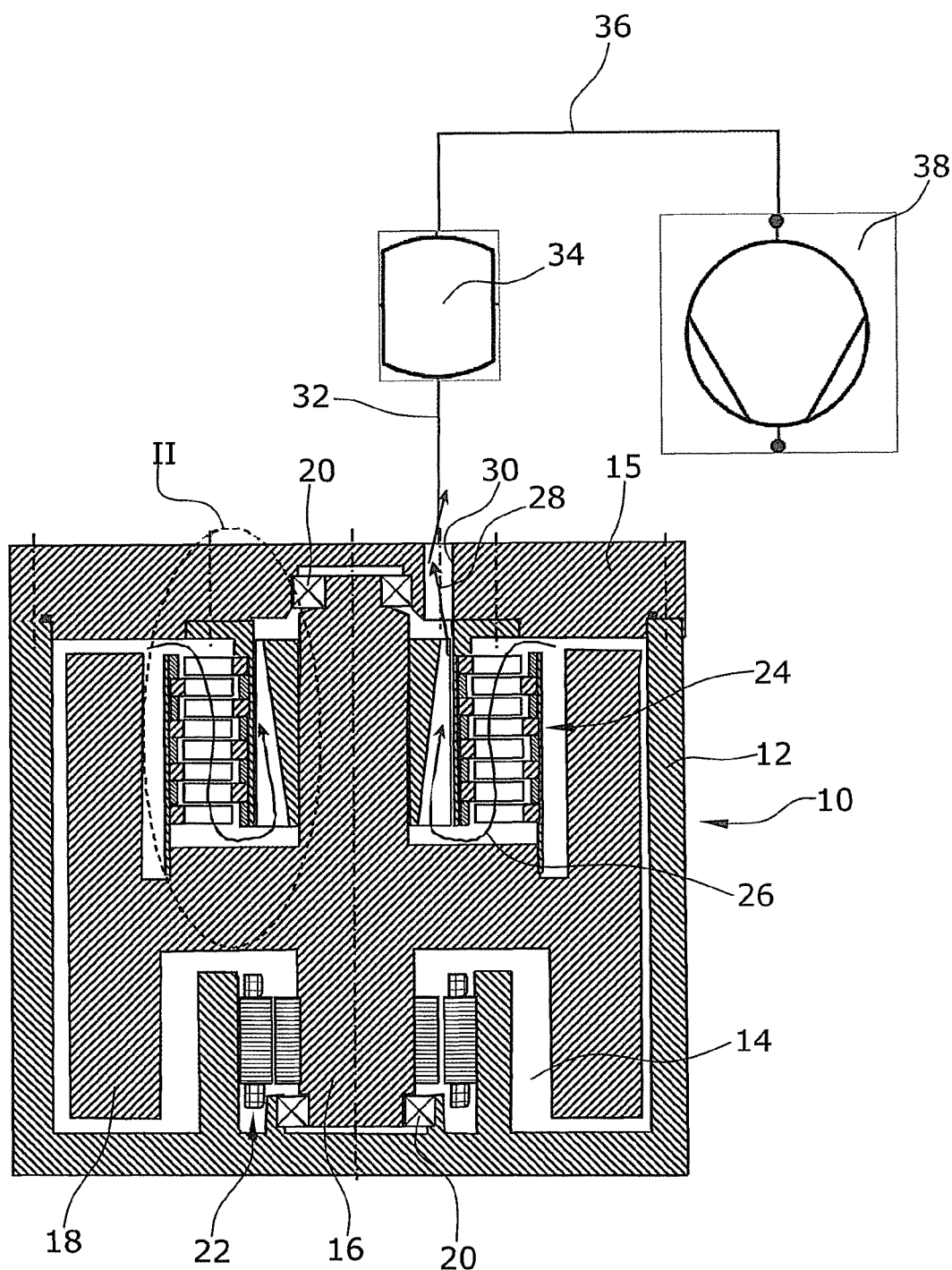
FIG. 1 is a schematic section of a preferred embodiment of a device for storing kinetic energy.

The schematically illustrated device for storing kinetic energy comprises a housing 10 with a housing base 12 and a housing cover 15. The housing 10 defines an interior 14 that is sealed against the environment and can thus be evacuated. A shaft 16 is arranged inside the housing 10, which shaft supports a flywheel 18 or is integrally formed with the flywheel 18. In the embodiment illustrated, the shaft 16 is supported in the housing base 12 and in the housing cover 15, respectively, via bearings 20. In a preferred embodiment, the bearings 20 are magnetic bearings.

Using a motor-generator unit 22, it is possible on the one hand to drive the flywheel for storing energy and on the other hand, when using the unit 22 as a generator, to use the flywheel to recover energy.

For improving the efficiency of the device for storing kinetic energy, the interior 14 is evacuated. For this purpose, a vacuum pump 24 is arranged on the shaft 16, i.e. in an inner, central portion of the interior 14, which pump is illustrated in an upscaled manner in FIG. 2 for clarification. Using the vacuum pump 24, gases present in the interior 14 are conveyed in the direction of the arrows 26, 28 through a housing outlet 30.

For a further improvement of the efficiency, a buffer chamber 34 is connected to the outlet 30 via a schematically illustrated line 32, and a backing pump 38 is connected to the chamber via a further schematically illustrated line 36. The backing pump 38 pumps against atmosphere.

In particular, by providing the vacuum pump 24, it is possible to generate a low vacuum pressure of in particular less than $10^{-4}$ mbar in the interior 14. Providing the backing pump 38 is necessary, since the upstream vacuum pump 24 cannot pump against atmosphere. In operation, the backing pump 38 may be deactivated most of the time, as long as the backing pressure allowable for the vacuum pump 24 is not exceeded. This is possible. Since only small quantities of gas reach the interior 14, e.g. because of leaks.

By interposition of the buffer chamber 34, in which the backing pump 38 generates a vacuum, it is possible to further improve the efficiency, since an activation of the backing pump 38 and thus the consumption of energy can thus be avoided in operation.

Figure 2:
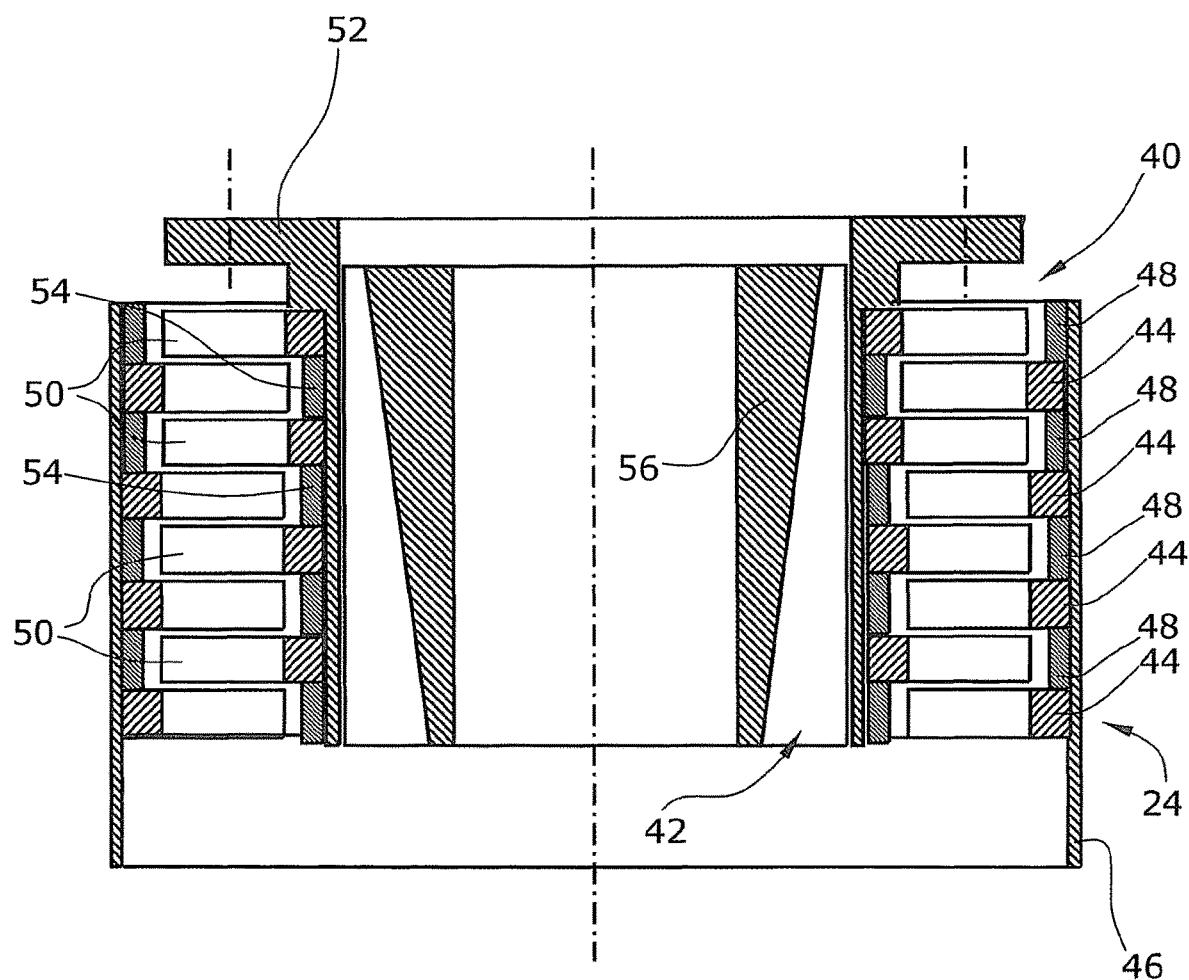
FIG. 2 is an enlarged schematic view of the vacuum pump arranged in region II in FIG. 1.

In the embodiment illustrated in FIGS. 1 and 2, the vacuum pump comprises a turbomolecular stage 40, as well as a Holweck stage 42 following the same in the flow direction. This Holweck stage could also be a Siegbahn stage as described in patent DE 10 2012 110 691. In the embodiment illustrated, the turbomolecular stage 40 is an outer rotor. In this regard, rotor discs 44 of the turbomolecular pump 40 are connected to an outer casing 46 in the embodiment illustrated. Annular spacers 49 are arranged between the individual rotor discs. The individual rotor discs 44 are thus fixed in the casing 46. The casing, which in particular is a fiber-reinforced casing, is fixedly connected to the flywheel 18 (FIG. 1). By providing the casing 46, which is designed e.g. as a cylindrical CFC tube, the effect of the centrifugal forces on the vacuum pump 24 is reduced.

The turbomolecular stage 40 further comprises stator discs 50 connected to an inner casing 52. The distance between the stator discs 50 is defined by annular spacers 54. The inner casing 52 is fixedly connected to the housing 10 (FIG. 1) and the housing cover 15, respectively. The inner casing 52 may be reinforced with carbon fibers or may be designed as a CFC tube. However, this is not ultimately necessary in this embodiment, since the inner casing 52 is stationary and includes no rotating parts.

In the preferred embodiment of the disclosure illustrated in FIGS. 1 and 2, the Holweck stage 42 (optionally also a Siegbahn or Gaede stage) is arranged downstream the turbomolecular pump stage 40. In this embodiment, the Holweck stage is arranged completely in the turbomolecular pump stage 40 in the radial direction. The schematically illustrated Holweck stage 42 is designed as an outer thread in the embodiment illustrated. Of course, the Holweck stage 42 could also be provided with an inner thread. An inner component 56 of the Holweck stage, which in the illustrated embodiment preferably has a thread, is fixedly connected to the shaft 16 (FIG. 1).

For the operation of the turbomolecular pump, the inner component 56 of the Holweck stage, as well as the rotor discs 44 are driven due to the connection to the shaft 16 and the flywheel 18, respectively.

Figure 3:
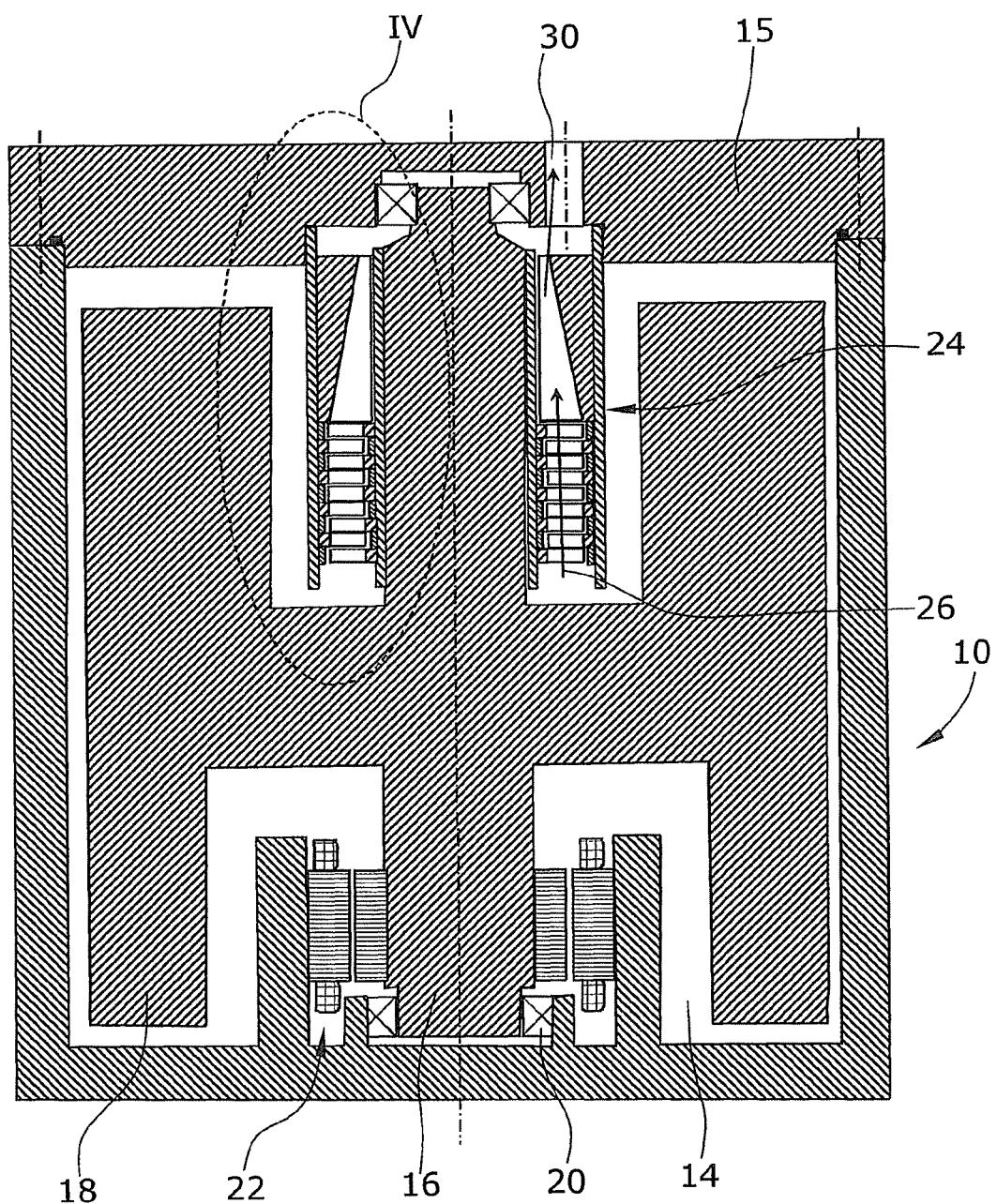
FIG. 3 is a schematic section of a further preferred embodiment of a device for storing kinetic energy.
Figure 4:
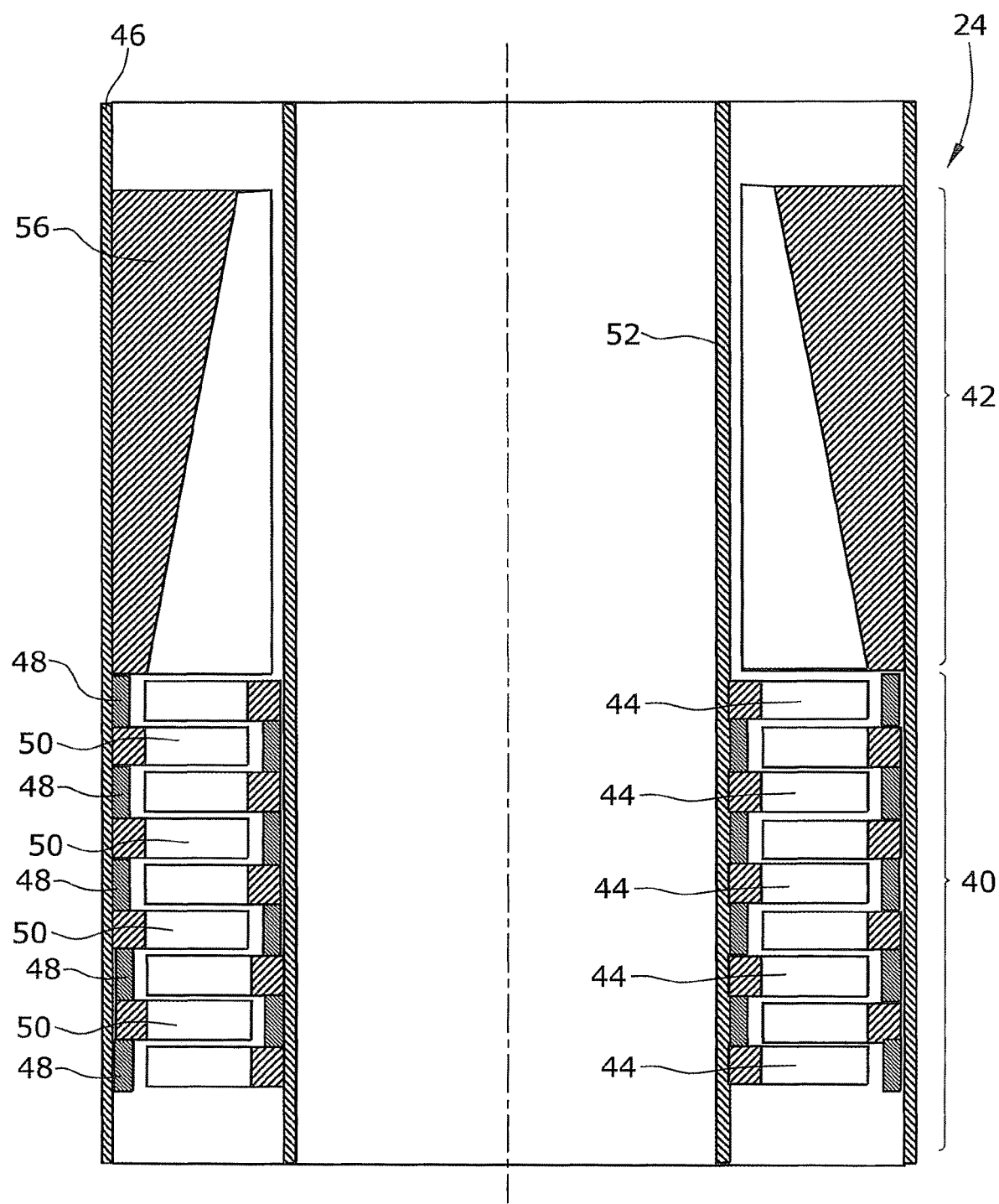
FIG. 4 is an enlarged schematic view of the vacuum pump arranged in region IV in FIG. 1.

In the further preferred embodiment illustrated in FIGS. 3 and 4, similar or identical components are identified by the same reference numerals. The principle of the energy storage and of the energy recovery by means of the flywheel 18 and the motor-generator unit 22 corresponds to that described with respect to FIG. 1.

It is likewise preferred that the housing outlet 30 is connected to a backing pump 38 and, optionally, also to a buffer chamber 34. The two embodiments differ be the design of the vacuum pump 24 arranged in the interior 14 of the housing 10, which pump is illustrated in larger scale in FIG. 4.

The vacuum pump 24 (FIG. 4) used in this embodiment also comprises a turbomolecular pump 40, with a Holweck stage 42 (optionally also a Siegbahn or Gaede stage) being arranged downstream thereof in the flow direction 26. In the embodiment illustrated, the turbomolecular pump stage 42 is designed as an inner rotor. Correspondingly, the rotor discs 44 are fixedly connected to the inner casing 52. The inner casing 52 is fixedly connected to the shaft 16.

The stator discs 50 are fixedly connected to the outer casing 46 by means of spacer rings 48. The outer casing 46 is fixedly connected to the housing cover 15.

The Holweck stage 42 is arranged downstream of the turbomolecular pump stage 40 in the flow direction 26. The former comprises a component 56 which preferably has a thread so that, in the embodiment illustrated, the Holweck stage 42 is also provided with an inner thread. Likewise, the Holweck stage can also be provided with an outer thread.

In this embodiment it is preferred that the inner casing 52 that supports the rotating components, has a carbon fiber reinforcement or is designed as a CFC tube.

Instead of providing casings 52, 46, it is also possible to connect the turbomolecular pump stage 40 and/or the Holweck stage 42 directly to the corresponding components, i.e. the housing 10 and the flywheel 18, respectively, or the shaft 16. This has the advantage that on the one hand the number of components is lower, while on the other hand the reduction of the effect of the centrifugal forces on the vacuum pump by providing the corresponding casings can be omitted.

However, providing the casings 52, 46 has the advantage that the vacuum pump can be pre-assembled and can be installed in the energy storage as a pre-assembled unit.

What is claimed is:

1. A device for storing kinetic energy, comprising:
a flywheel arranged in an interior of a housing,
a shaft connected to the flywheel and supported in the housing,
a motor-generator unit for driving the flywheel and for recovering energy, and
a vacuum pump provided in the housing for evacuating the interior, wherein the vacuum pump is arranged on the shaft, and wherein the vacuum pump comprises a turbomolecular pump stage with a gas friction compressor, the gas friction compressor being arranged downstream of the turbomolecular pump stage in a flow direction.

2. The device of claim 1, wherein the vacuum pump is arranged on the shaft as a separate component.

3. The device of claim 1, wherein the turbomolecular pump stage is a pump with a large pressure range, wherein a compression from 20 mbar to less than $10^{-5}$ mbar is performed.

4. The device of claim 1, wherein the vacuum pump is arranged at least partly inside an outer casing.

5. The device of claim 4, wherein the outer casing comprises fiber-reinforced plastic material.

6. The device of claim 4, wherein the outer casing is connected to the flywheel or the housing.

7. The device of claim 4, wherein the outer casing supports rotor discs of the vacuum pump.

8. The device of claim 4, wherein the outer casing supports stator discs of the vacuum pump.

9. The device of claim 1, wherein the vacuum pump is arranged at least partly outside an inner casing.

10. The device of claim 9, wherein the inner casing is connected to the housing or the shaft.

11. The device of claim 9, wherein the inner casing comprises fiber-reinforced plastic material.

12. The device of claim 9, wherein the inner casing supports rotor discs of the vacuum pump.

13. The device of claim 9, wherein the inner casing supports stator discs.

14. The device of claim 9, wherein the vacuum pump is arranged at least partly between an outer casing and the inner casing.

15. The device of claim 1, wherein the gas friction compressor is a Holweck stage and the turbomolecular pump stage at least partly surrounds the Holweck stage.

16. The device of claim 1, wherein the flywheel at least partly surrounds the vacuum pump.

17. A device for storing kinetic energy, comprising:
a flywheel arranged in an interior of a housing,
a shaft connected to the flywheel and supported in the housing,
a motor-generator unit for driving the flywheel and for recovering energy,
a vacuum pump provided in the housing for evacuating the interior, wherein the vacuum pump is arranged on the shaft, and wherein the vacuum pump comprises a turbomolecular pump stage with a gas friction compressor, the gas friction compressor being arranged downstream of the turbomolecular pump stage in a flow direction, and a backing pump connected to a housing outlet.

18. The device of claim 17, further comprising a buffer chamber provided between the housing outlet and the backing pump.

* * * * *